Nov. 22, 1927.

W. R. ZESINGER

PORTABLE TRACK

Filed Jan. 27, 1927

1,650,254

INVENTOR.
William R. Zesinger
BY
ATTORNEY.

Patented Nov. 22, 1927.

1,650,254

UNITED STATES PATENT OFFICE.

WILLIAM R. ZESINGER, OF SOUTH BEND, INDIANA.

PORTABLE TRACK.

Application filed January 27, 1927. Serial No. 164,098.

The invention relates to portable tracks adapted to be placed beneath an automobile wheel for preventing the same from spinning, for instance in soft ground or on ice and comprising a sheet of material having grit or other particles thereon or imbedded therein for preventing spinning of the wheel and slipping of the sheet of material, the grit forming means for digging into and gripping the ground or ice and the tire of the wheel.

A further object is to provide a portable track formed from a sheet of flexible material having grit on opposite sides thereof preferably imbedded therein, said flexible sheet of material conforming to the surface on which the sheet is placed, thereby insuring a positive gripping of the ground or ice and of the tire of the wheel, irrespective of the contour of the ground.

A further object is to provide a portable track comprising a sheet of flexible material relatively thin and grit carrying members formed from flexible material and carried by opposite sides thereof.

A further object is to provide a portable track formed from a flexible sheet of material, longitudinally transversely flexible and having grit carrying strips secured to opposite sides thereof and formed from flexible material, said sheet of material and strip being relatively thin, thereby allowing the device as a whole to be easily stored within an automobile. The use of spaced strips which are preferably adhesively secured to opposite sides of the flexible sheet allows the edges of said strips to form additional gripping means, and at the same time materially reduces the cost of manufacture as it eliminates placing grit on the entire opposite surfaces of the flexible member.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
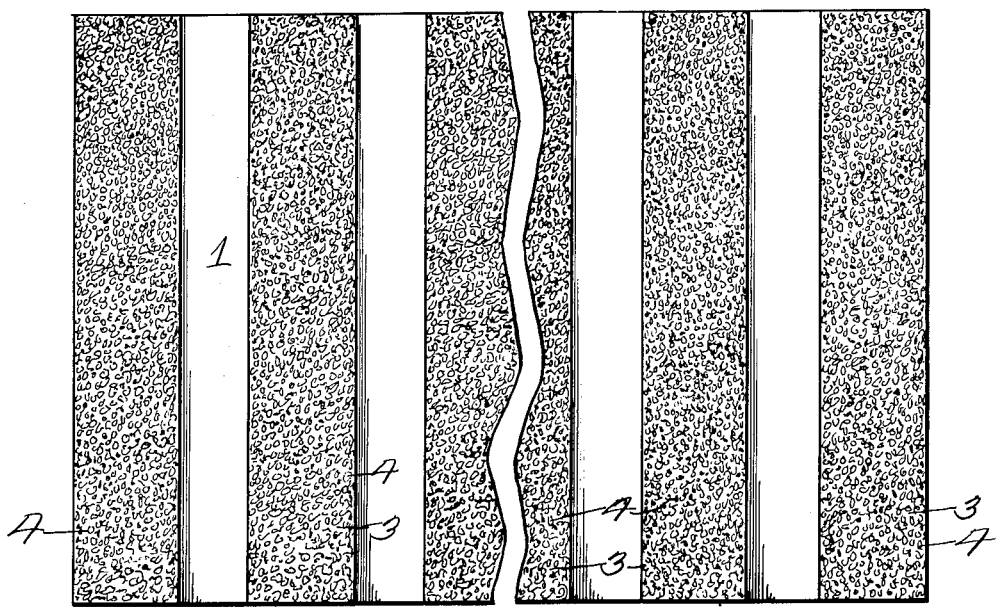
Figure 1 is a top plan view of the portable track.
Figure 2:
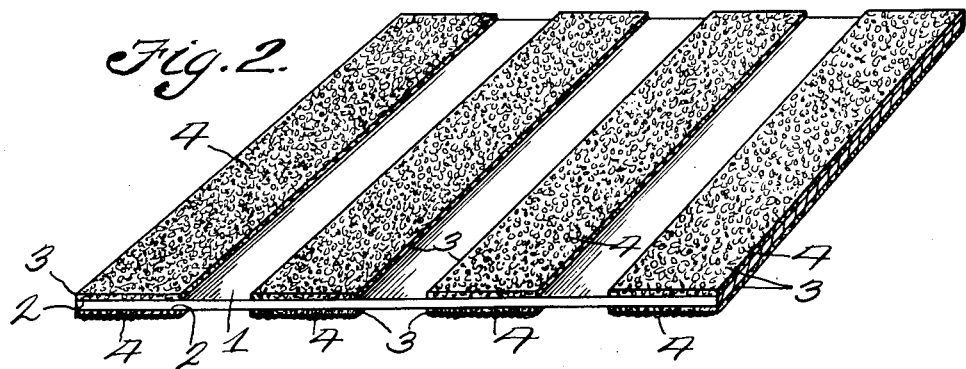
Figure 2 is a perspective view of a portion of the portable track.

Referring to the drawing the numeral 1 designates the body of the device, which is preferably formed from a water proof pliable material for instance asphalted felt which is a felt material impregnated with asphalt, however it is to be understood that applicant does not limit himself to this particular material, but by using this material a tough cheap device is obtained which is water proof, and at the same time is pliable and will easily under the weight of an automobile wheel conform to surface irregularities, thereby insuring a maximum gripping of the device on a surface and maximum traction of the automobile tire. The body 1 may be of any length or width, and for purposes of illustration is shown oblong shaped.

Secured to opposite sides of the flexible body 1 adhesively at 2 are flexible strips 3 preferably formed from felt impregnated with asphalt, which strips extend transversely of the body member 1 in spaced relation and the strips on opposite sides are preferably in registration whereby the longitudinal edges of the strips 3 will form additional gripping means in addition to the particles of grit 4 which cover the entire outer surfaces of the strips 3 and are imbedded in the strips and the asphalt therein. In adhesively securing the flexible strips 3 to the body 1 at 2, this may be accomplished before the asphalt, with which the body 1 is impregnated, hardens at which time the strips may be placed in position, and when the asphalt hardens, they will be adhesively held in position. When an automobile wheel is on the device, the tire will not spin incident to the gripping of the tire by the grit and at the same time the strips 3 which are preferably formed from flexible material, such for instance as asphalted felt, will bend or flex according to the curvature of the ground, thereby insuring a positive gripping of the ground by the grit of the strips and the edges of the strips. The grit may be crushed stone, slag or any other material and applicant does not limit himself to any particular kind of material. Strips 3 and the body member 1 are relatively thin, therefore it will be seen that the portable track may be easily stored within the automobile, for instance under the seat or under the floor carpet without rolling the device. However for other storage, the device by being transversely and longitudinally flexible may be rolled into a compact package which will easily pass into a tool chest or other storage place. It has been found that the device operates equally as well in relatively soft material as on a hard surface and is particularly efficient on icy hard surfaces, for instance adjacent a curb, as it instantly grips without any slipping and conforms to the surface of the ground incident to its flexibility.

In manufacture the gritted strips 3 are first impregnated with an asphalt coating and before the same becomes hardened or set the grit is applied thereto and is preferably partially forced in the strip, for instance between rollers, however applicant does not limit himself to the mode of manufacture of the strips or to the particular material from which the strips and body are made.

From the above it will be seen that a portable track is provided for automobile wheels, which track is formed from a water proof flexible material, thereby obviating the difficulty of the device becoming saturated with water and consequent necessity of drying the same, that the grip strips on opposite sides thereof will positively grip the ground and the tire, and the device may be cheaply manufactured and sold.

The invention having been set forth what is claimed as new and useful is:

1. A portable track comprising a flat pliable body member having spaced gritted surface gripping areas on one side thereof.

2. A portable track comprising a flat longitudinally and transversely pliable body body member having spaced gritted surface gripping areas on opposite sides thereof.

3. A portable track comprising a flat longitudinally and transversely pliable body member having spaced pliable gritted surface gripping areas on opposite sides thereof.

4. A portable track comprising a flat pliable body member having spaced pliable gripping strips on opposite sides thereof, said strips being secured to opposite sides of the body member and in registration with each other, and gripping particles imbedded in the outer surfaces of said strips.

5. A portable track comprising an elongated pliable body member, transversely disposed pliable spaced strips secured to opposite sides of said body member, said strips being in registration, and gripping particles imbedded in the outer faces of said strips.

6. A portable track comprising a sheet of pliable water proof material and a plurality of spaced strips of gritted pliable water proof material secured to opposite sides of said body member.

7. A portable track comprising a sheet of pliable material, spaced parallel strips of pliable material adhesively secured to said body member on opposite sides thereof and particles of grit imbedded in the outer faces of the strip.

In testimony whereof I affix my signature.

WILLIAM R. ZESINGER.